United States Patent
Ghosh et al.

(10) Patent No.: US 11,907,205 B1
(45) Date of Patent: Feb. 20, 2024

(54) GENERIC PARITY SOLUTION FOR HIGHLY DYNAMIC SOURCES

(71) Applicant: INTUIT INC., Mountain View, CA (US)

(72) Inventors: Suman Ghosh, Bangalore (IN); Mayur Madnani, Bangalore (IN)

(73) Assignee: Intuit, Inc., Mountain View, CA (US)

( * ) Notice: Subject to any disclaimer, the term of this patent is extended or adjusted under 35 U.S.C. 154(b) by 0 days.

(21) Appl. No.: 18/157,869

(22) Filed: Jan. 23, 2023

(51) Int. Cl.
G06F 7/00 (2006.01)
G06F 17/00 (2019.01)
G06F 16/23 (2019.01)

(52) U.S. Cl.
CPC ...... G06F 16/2365 (2019.01); G06F 16/2358 (2019.01)

(58) Field of Classification Search
None
See application file for complete search history.

(56) References Cited

U.S. PATENT DOCUMENTS

| 2015/0277965 A1* | 10/2015 | Bradshaw | G06F 9/3867 718/101 |
| 2016/0070735 A1* | 3/2016 | Bloomfield | G06F 16/2365 707/741 |
| 2016/0110406 A1* | 4/2016 | Zircher | G06F 16/282 707/690 |
| 2017/0193031 A1* | 7/2017 | Papapanagiotou | G06F 11/1451 |
| 2018/0277158 A1* | 9/2018 | Kishino | G11B 20/1833 |

* cited by examiner

*Primary Examiner* — Tuan A Pham
(74) *Attorney, Agent, or Firm* — Patterson & Sheridan, LLP

(57) ABSTRACT

Certain aspects of the present disclosure provide techniques for efficient data parity. Embodiments include receiving, by a first data consuming component, from a publication service, a plurality of database change records indicating changes to an underlying data source. Embodiments include updating, by the first data consuming component, a secondary data store based on the plurality of database change records. Embodiments include selecting a sample subset of the plurality of database change records based on one or more conditions. Embodiments include, for each respective database change record in the sample subset that has already been consumed by a second data consuming component that updated a primary data store based on one or more database change records: comparing the respective database change record to first data from the primary data store that corresponds to the respective database change record and making a parity determination based on the comparing.

17 Claims, 4 Drawing Sheets

US 11,907,205 B1

GENERIC PARITY SOLUTION FOR HIGHLY DYNAMIC SOURCES

INTRODUCTION

Aspects of the present disclosure generally relate to efficient parity checking for highly dynamic data sources. For example, embodiments involve the use of a secondary data store, change record offset values, specific columns, and sample data that includes a subset of data written to the secondary data store for checking parity of a primary data store.

BACKGROUND

Organizations are creating and using an ever increasing amount of data. It is often the case that a single organization may create and use the same or similar data across different parts of the organization, such as across different business units. While it may be simplest to maintain a single, "master" set of data for use by the whole organization, such a configuration is impractical and inefficient for a variety of technical reasons. Thus, organizations frequently duplicate data, or store the same or similar data in different repositories, servers, record systems, and the like. For example, a large organization may implement a number of databases storing the same or similar data, where each of the databases may be used by a separate business unit that utilizes the data in different ways. In another example, an organization may replicate data that is stored in its source database system at a number of other duplicate database systems to assure fault tolerance and data availability in the event of data loss at the source database system. Unfortunately, it is not uncommon for data stored in different repositories to become out of sync or inconsistent because, for example, different parts of an organization may create, maintain, and store data in different ways as meets their particular use cases. In some cases, mere programming errors, such as replication programming, network failures, and other issues may introduce errors in data that is copied across different systems' repositories. As the number of database systems grows, so does the risk of data inconsistency among the systems.

Organizations have traditionally implemented a number of different solutions to identify and resolve data inconsistencies among disparate data systems. For example, bit-by-bit, block-by-block, or similar replication and synchronization schemes may be used to keep data repositories consistent. However, existing solutions are inefficient in terms of resource utilization and may be extremely time consuming. In fact, in some cases, traditional synchronization schemes simply cannot keep up with the pace at which organizations create and change data.

Accordingly, what is needed are improved systems and methods for identifying data inconsistencies between data storage systems.

BRIEF SUMMARY

Certain embodiments provide a method for efficient data parity. An example method generally includes: receiving, by a first data consuming component, from a publication service, a plurality of database change records indicating changes to an underlying data source; updating, by the first data consuming component, a secondary data store based on the plurality of database change records; selecting a sample subset of the plurality of database change records based on one or more conditions; and for each respective database change record in the sample subset that has already been consumed by a second data consuming component that received one or more database change records from the publication service and updated a primary data store based on the one or more database change records: comparing the respective database change record to first data from the primary data store that corresponds to the respective database change record; and making a parity determination based on the comparing, wherein a notification is generated based on the parity determination.

Other embodiments provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
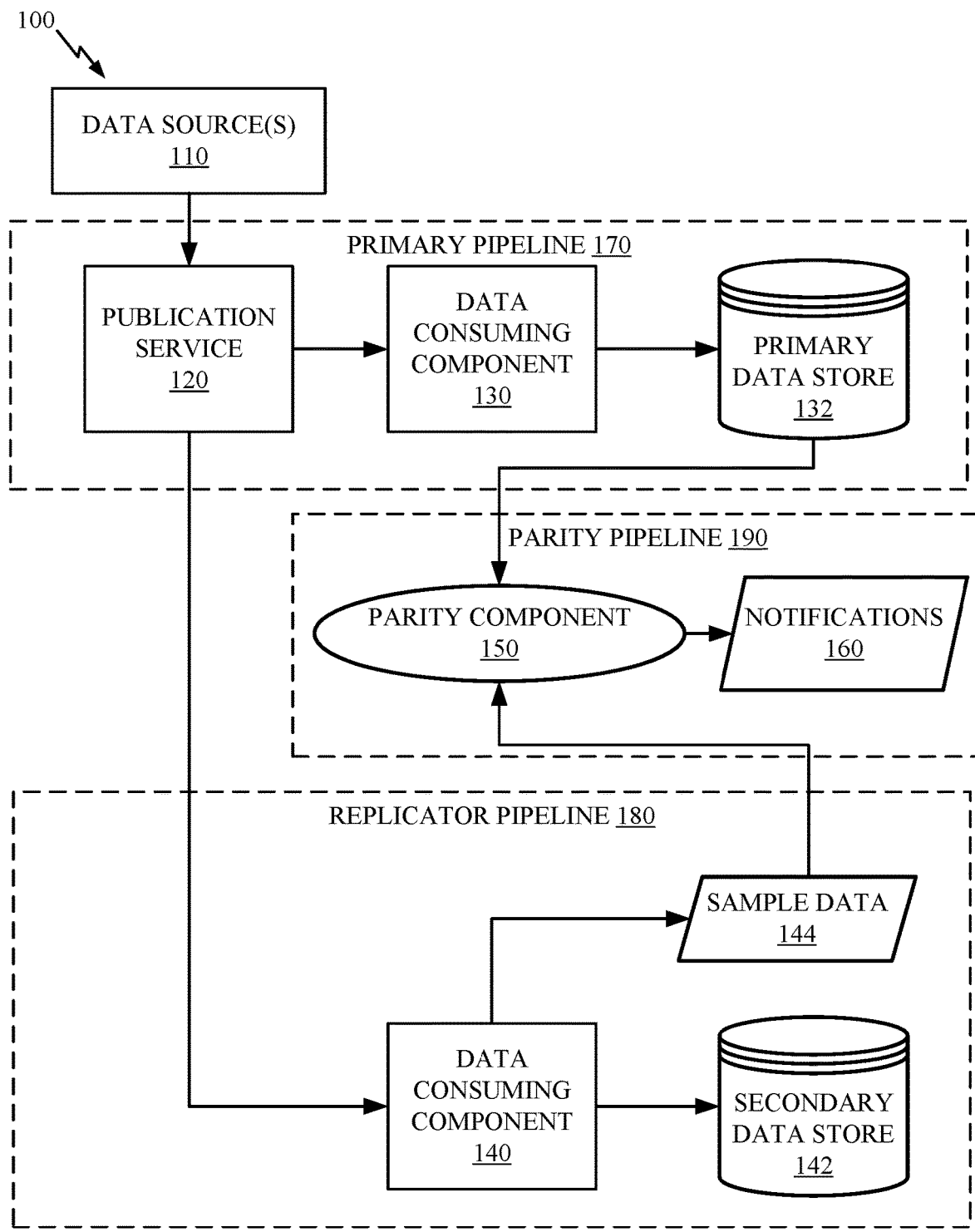
FIG. 1 is an illustration of an example related to efficiently identifying data inconsistencies between electronic data storage systems, according to embodiments of the present disclosure.

Aspects of the present disclosure provide apparatus, methods, processing systems, and computer readable mediums for efficiently identifying data inconsistencies between electronic data storage systems. In order to solve the problems with existing solutions, such as inefficiency, high resource utilization, and heavy load on critical data sources, the data parity methods disclosed herein involve creating a secondary data store that serves as a source of truth with respect to a primary data store for use in checking parity of the primary data store without a need to query an underlying data source (e.g., that may be in the critical path for a number of software components). Furthermore, embodiments involve selecting a subset of database change records written to the secondary data store as a representative sample for checking data parity between the secondary data store and a primary data store. The secondary data store may, for example, be a record store that stores records of changes made to one or more underlying data sources such that the one or more underlying data sources can be reconstructed from the record store. For example, secondary data store does not necessarily need to store the entire contents of the underlying data sources, but may store change events that relate to the underlying data sources. Primary data store 132 may store the entire contents of one or more underlying data sources. For example, data stored in primary data store 132 may be updated as needed over time based on received records of changes rather than simply storing the records of changes (e.g., as does secondary data store 142).

As described in more detail below with respect to FIG. 1, database change records from one or more underlying data sources (e.g., databases) may be published to a data publication service, and one or more data consuming components may receive the database change records from the data publication service. A database change record may indicate a change to one or more particular columns, such as with respect to data in one or more rows of a database. In some embodiments, the database change records are associated with sequential identifiers, which may be referred to as offsets, that increase sequentially with each subsequent database change record published to the data publication service. The offset of a given database change record is unique to that record and can be used to identify the order in which records were published. For example, a first data consuming component may retrieve database change records from the database publication service and update a primary data store based on the retrieved records, and a second data consuming component may retrieve database change records from the database publication service and write the retrieved records to a secondary data store. According to certain embodiments, the second data consuming component may also select a subset of the retrieved records as sample data.

An initial parity check may be performed between the secondary data store and the one or more underlying data sources, and then the secondary data source may be used as a source of truth for checking parity of the primary data source without the need to query the underlying data source(s). In order to further improve efficiency and reduce utilization of computing resources while still providing assurance of data consistency, some techniques described herein involve utilizing the sample data to perform a parity check between the primary data store and the secondary data store. For example, each record included in the sample data (e.g., which was also used to update the secondary data store) may be compared to corresponding data stored in the primary data store to determine whether there are any inconsistencies. If there are no inconsistencies, then a parity match may be determined. If there is an inconsistency, then offset numbers of database change records used to update the secondary data store and the primary data store may be compared in order to determine whether the inconsistency may actually be a result of a timing issue (e.g., if the sample data store is more up-to-date than the primary data store), as described in more detail below with respect to FIG. 2. If no timing issue is determined, then the inconsistency may result in a parity failure determination. If a timing issue is determined, then a parity determination may be deferred, such as until the secondary data store and the primary data store have both been updated by a database change record with the same highest offset number.

A parity failure determination may result in generation of a notification, such as identifying a portion of data that failed the parity check. The notification may allow action to be taken to correct the parity failure, such as resynchronizing the primary data store, delaying accessing data from the primary data store until the parity failure is resolved, and/or the like.

Embodiments of the present disclosure allow parity checking to be performed in a manner that utilizes less physical computing resources and puts less strain on underlying data sources than existing techniques. For example, the use of a secondary data store as a source of truth for determining parity of a primary data store without the need to connect to and/or query an underlying data source improves efficiency and avoids overloading the underlying data source. Furthermore, utilizing a selected subset of database change records that were written to a secondary data store as a representative sample for performing a parity check allows fewer comparisons to be performed while still arriving at a parity determination that is representative of the totality of data in the secondary data store. Furthermore, by using offset values to ensure that inconsistencies are not merely results of timing issues before making parity determinations, embodiments of the present disclosure reduce false positives, avoid unnecessary processing associated with such false positives, and improve system accuracy. Efficiencies provided by techniques described herein allow parity checks to be performed in real time or near real time, which is not possible with existing techniques, particularly when large amounts of data are involved. Furthermore, even if underlying data sources are constantly changing, embodiments of the present disclosure allow parity checks to be efficiently performed based on database change records.

Efficient Parity Techniques

FIG. 1 is an illustration 100 of an example related to efficiently identifying data inconsistencies between electronic data storage systems, according to embodiments of the present disclosure.

One or more data sources 110 publish database change records to a publication service 120. Data sources 110 may include, for example, one or more databases comprising tables with data stored in columns and rows. A database change record may, for instance, indicate a change to one or more rows in one or more columns of one or more tables of a database. Database change records may be generated based on operations performed by one or more software applications that utilize data stored in one or more databases. In some embodiments, database change records include additional data, such as timestamps.

Publication service 120 generally publishes database change records for receipt/retrieval by one or more data consuming components (e.g., data consuming components 130 and 140). Publication service 120 may, for example, be the Apache® Kafka® platform, database change records may be published to a Kafka® topic, and data consuming components may be Kafka® consumers that poll, subscribe to, or otherwise receive data from the topic. Other types of publication services may alternatively be used. Publication service 120 may run on the same device as data source(s) 110, data consuming components 130 and/or 140, and/or may run on one or more different devices (e.g., on one or more cloud servers).

Primary pipeline 170 represents a data pipeline related to populating primary data store 132. A data pipeline, generally, is a set of data processing elements connected in series, where the output of one element is the input of the next one. In primary pipeline 170, data consuming component 130 receives database change records from publication service 120 and updates primary data store 132 based on the database change records. Primary data store 132 may be a data storage entity that stores data from one or more underlying data sources such as databases, and the data stored in primary data store 132 may be updated as appropriate based on change records indicating changes to the underlying data sources. For example, if a received database change record indicates that a value stored in association with a particular key was changed to an alternative value, then primary data store 132 may be updated to store the alternative value in association with the particular key. Primary data store 132 may, for example, be a key-value store.

Replicator pipeline 180 represents a data pipeline related to populating a secondary data store 142, which may serve as a source of truth for primary data store 132. In replicator pipeline 180, data consuming component 140 receives database change records from publication service 120 and writes the database change records to secondary data store 142. Secondary data store 142 may be a data storage entity that stores records of changes made to one or more underlying data sources such as databases. In some embodiments, secondary data store 142 stores the entirety of the database change records received by data consuming component 140, including offset values, partition identifiers, topic names, indications of changed columns, timestamps, and/or the like. Secondary data store 142 may, for example, be a key-value store.

Parity of primary data store 132 may be determined with reference to secondary data store 142 without the need to connect to or query the one or more underlying data sources 110.

While performing a parity check between secondary data store 142 and primary data store 132 reduces load on data source(s) 110 and improves efficiency, such a parity check may require a significant amount of computing resources, particularly as the amount of data stored in the two data stores grows. For example, the computing resource utilization and time needed to retrieve and compare each record from secondary data stores 142 to corresponding data in primary data store 132 may result in reduced performance of computing devices involved, latency, delays, and/or the like. As such, certain embodiments of the present disclosure involve, as part of replicator pipeline 180, selecting sample data 144 including a subset of the database change records that are written to secondary data store 142.

Data consuming component 140 may select a subset of the database change records that it receives from publication service 120 as sample data 144. The subset may be selected based on one or more conditions, such as based on one or more attributes of the database change records. In one example, the subset includes all database change records that relate to a particular entity, such as a particular business or user. Techniques in which the subset includes all records related to a particular entity may provide an advantage in that parity can be completely confirmed at least for that entity, in addition to parity being confirmed with a high probability of accuracy for all data in secondary data store 142 of which the subset is a representative sample. Other techniques for selecting the subset may include selecting every nth database change record, selecting at least one database change record that relates to each distinct entity, selecting a certain number of database change records received in each given time interval of a series of consecutive time intervals, and/or the like. The size of the subset may be determined based on a number of factors. For example, the subset may include a certain percentage or portion of all records received, a certain percentage or portion of all records received in a given time interval, a certain quantity of data, and/or the like.

Parity pipeline 190 is a data pipeline related to performing a parity check between primary data store 132 and secondary data store 142, such as based on sample data 144. Parity component 150 represents a software component that performs a parity check, such as receiving and comparing records from two data stores. The operations performed by parity component 150 are described in more detail below with respect to FIG. 3. For example, parity component 150 may, for each record from sample data 144 that has been consumed by both primary pipeline 170 and replicator pipeline 180, retrieve the corresponding data from primary data store 132 in order to determine whether there are any inconsistencies between the data from primary data store 132 and the change record that was stored in secondary data store 142. Apparent inconsistencies may cause offset values to be checked to determine whether a timing issue is the cause of a difference and, if so, a parity determination may be delayed until the timing issue is resolved. A timing issue may be determined if, for instance, secondary data store 142 has been updated by a database change record with a higher offset than has been used to update primary data store 132. Inconsistencies that are not determined to be a result of a timing issue may cause a parity failure determination.

In some embodiments a parity check is only performed for specific columns that are indicated to be changed in each given database change record. For example, each database change record published to publication service 120 may include an indication of one or more columns (e.g., in a corresponding row) of an underlying database that are changed by the record, and parity component 150 may retrieve only data corresponding to those one or more columns from primary data store 132 for comparison purposes when checking parity with respect to a given database change record. Unchanged columns may be ignored during such parity checks. By limiting parity checks only to specific columns that have been changed by a given database change record, embodiments of the present disclosure further improve upon existing parity techniques by reducing the amount of physical computing resources and time required to perform a parity check, thereby also improving the functioning of the computing devices involved.

While examples are described in which parity component 150 performs parity checks for database change events included in a sample subset selected by data consuming component 140, other embodiments involve parity component 150 performing parity checks on database change events that it receives (e.g., directly) from publication service 120. In such cases, parity component 150 may communicate with both data consuming components 130 and 140 to ensure that a given database change record has been consumed by both primary pipeline 170 and replicator pipeline 180 before performing a parity check based on the given database change record.

Parity component 150 may generate one or more notifications 160 based on its parity determinations. For example, a notification 160 may indicate that a parity check was successful, or may indicate a parity failure with respect to a certain portion of a data store. In one example, a notification 160 indicates that a particular column of a particular row in primary data store 132 is inconsistent with a database change record relating to that particular column of that particular row that is stored in secondary data store 142, such as including the differing data. Notification(s) 160 may result in a resynchronization of primary data store 132 and/or secondary data store 142, and/or may cause a user to perform one or more actions to resolve identified inconsistencies. In some embodiments, data retrieval from a data store (e.g., primary data store 132) may be halted or delayed when a parity failure occurs, such as until the identified inconsistency is resolved.

Figure 2:
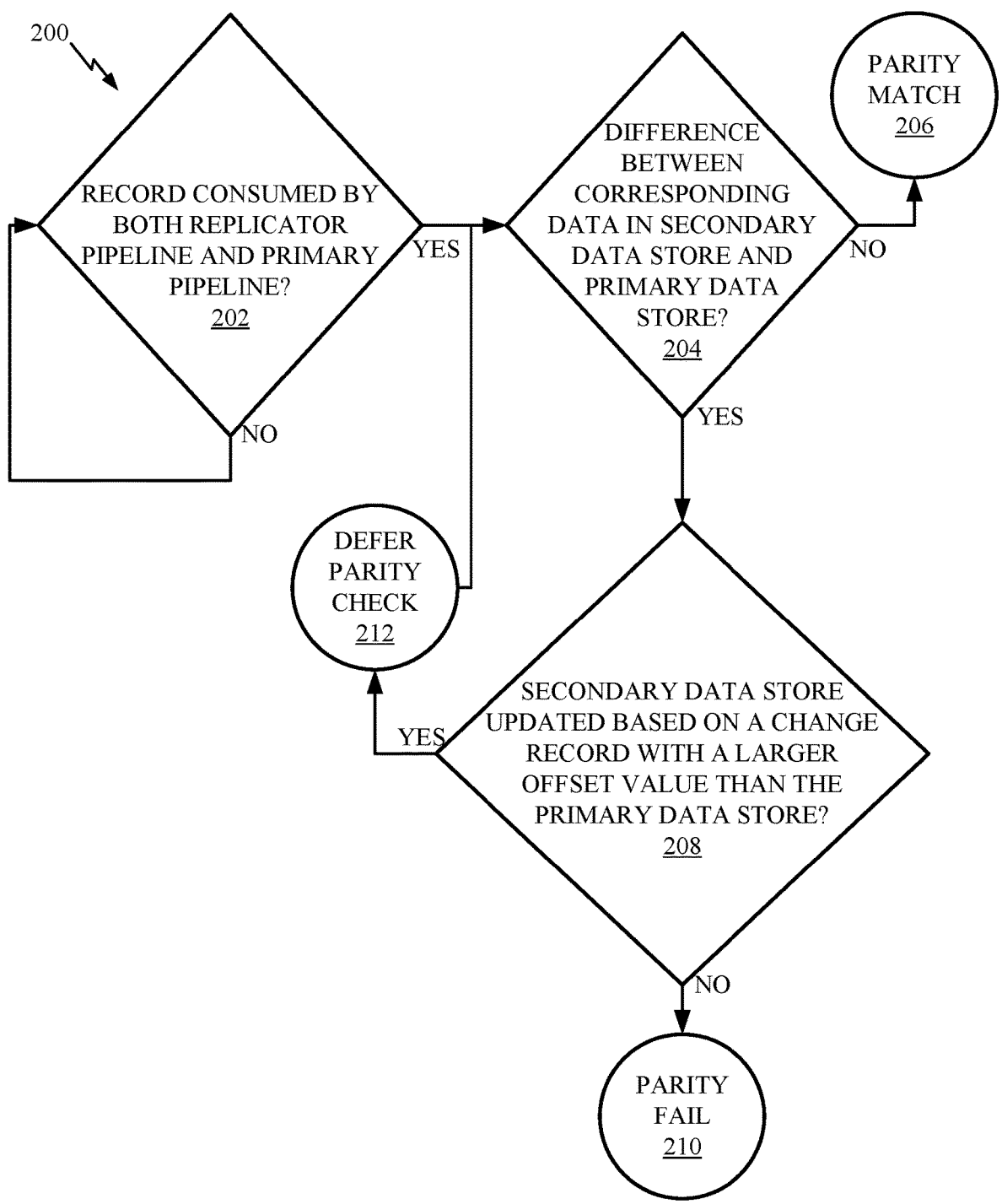
FIG. 2 is an illustration of another example related to efficiently identifying data inconsistencies between electronic data storage systems, according to embodiments of the present disclosure.

FIG. 2 is an illustration 200 of another example related to efficiently identifying data inconsistencies between electronic data storage systems, according to embodiments of the present disclosure. For example, illustration 200 may represent operations performed by parity component 150 of FIG. 1.

At step 202, a determination is made regarding whether a given database change record has been consumed by both a replicator pipeline and a primary pipeline. For example, with reference to FIG. 1, for each database change record included in sample data 144 parity component 150 may determine whether both replicator pipeline 180 and primary pipeline 170 have consumed the database change record (e.g., based on the offset value of the database change record), such as based on communication with data consuming component 130. In some embodiments, it can be assumed that the replicator pipeline has consumed the database change record, as it would not otherwise be included in the sample data, so parity component 150 may not need to separately communicate with data consuming component 140 in order to determine whether the database change record has been consumed by replicator pipeline 180.

If the given database change record has not been consumed by both the replicator pipeline and the primary pipeline, then a parity check with respect to the given database change record may be delayed. If the given database change record has been consumed by both the replicator pipeline and the primary pipeline then, at step 204, a determination is made regarding whether there are any differences between the database change record and the corresponding data stored in the primary data store. For example, with reference to FIG. 1, parity component 150 may retrieve data from primary data store 132 corresponding to the given database change record, such as retrieving data from a specific column that is indicated to be changed in the given database change record (e.g., querying primary data store 132 for this particular column in a corresponding row). If there are no inconsistencies between the data retrieved from the primary data store 132 and the given database change record, then a parity match is determined at step 206 with respect to the given database change record.

If there is an inconsistency between the data retrieved from primary data store 132 and the database change record, then, at step 208, a timing check is performed. The timing check involves determining whether the secondary data store has been updated based on a database change record with a larger offset value than a highest offset value used to update the primary data store (and/or, in some embodiments, vice versa). For example, with reference to FIG. 1, parity component 150 may communicate with data consuming components 130 and 140 to determine a highest offset value that has been used to update each of primary data store 132 and secondary data store 142. If the secondary data store has been updated by a database change record with a higher offset value than a latest database change record used to update the primary data store, then the parity check for the given database change record may deferred at step 212, such as until the primary data store has also been updated based on the database change record with the higher offset value. This is because, if the secondary data store is more up to date than the primary data store, then the data inconsistency may simply be a result of the timing issue and determining a parity failure may result in a false positive.

If the secondary data store has not been updated based on a database change record with a higher offset value than a highest offset value used to update the primary data store, then a parity failure is determined at step 210. A parity failure determination may result in a generation of a notification that indicates the failure, such as to prompt corrective action as appropriate.

Figure 3:
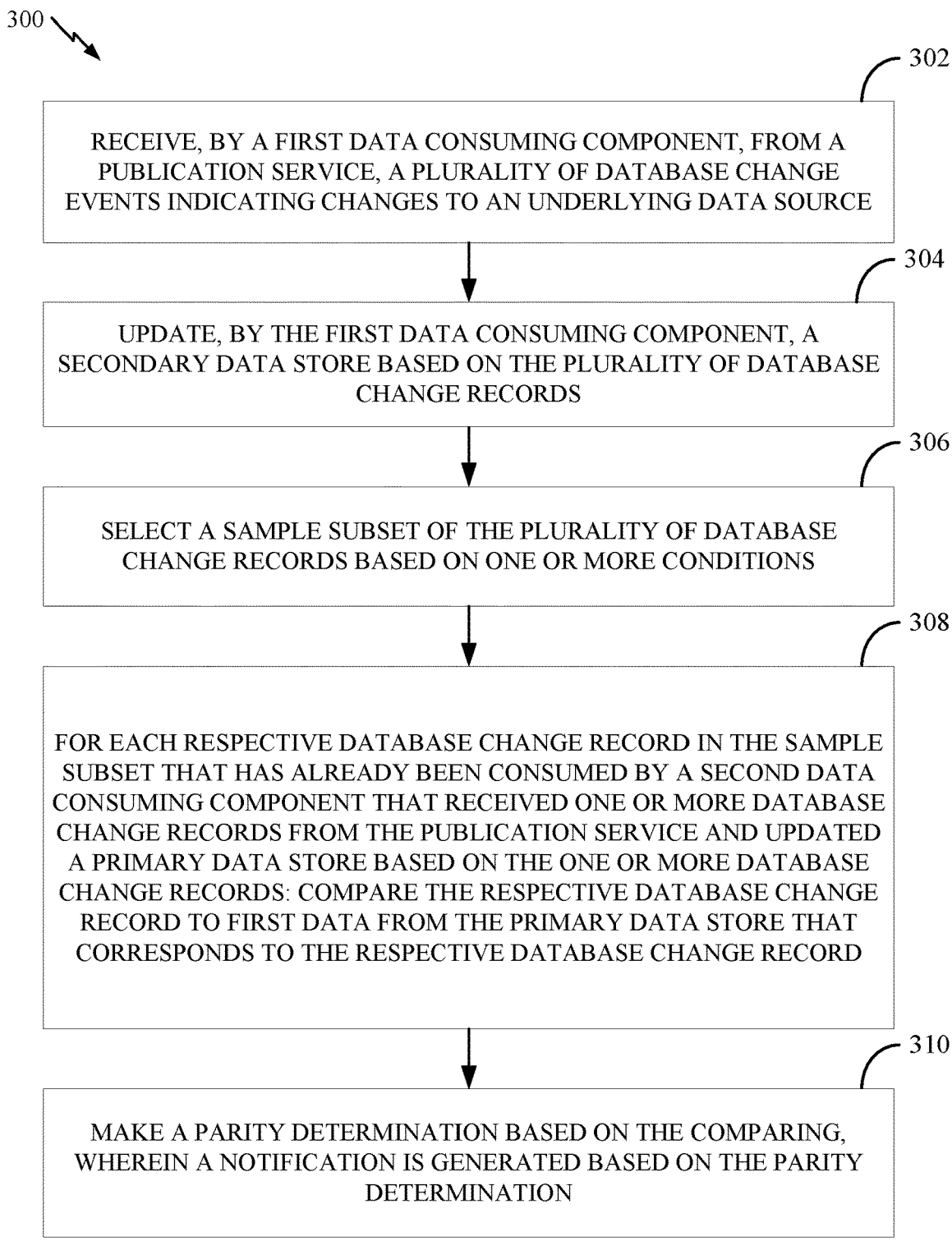
FIG. 3 illustrates example operations for efficiently identifying data inconsistencies between electronic data storage systems, according to embodiments of the present disclosure.

Example Method for Efficiently Identifying Data
Inconsistencies Between Electronic Data Storage
Systems FIG. 3 illustrates example operations 300 for efficiently identifying data inconsistencies between electronic data storage systems. Operations 300 may be performed by a software component running on a physical computing device, such as parity component 150 of FIG. 1, which runs on a computing device such as system 400 of FIG. 4.

As illustrated, operations 300 begin at step 302 with receiving, by a first data consuming component, from a publication service, a plurality of database change records indicating changes to an underlying data source.

Operations 300 continue at step 304, with updating, by the first data consuming component, a secondary data store based on the plurality of database change records.

Operations 300 continue at step 306, with selecting a sample subset of the plurality of database change records based on one or more conditions.

In some embodiments, the selecting of the sample subset of the plurality of database change records is based on attributes of the plurality of database change records. For example, the attributes of the plurality of database change records may comprise user identifiers associated with the plurality of database change records. In one embodiment, the selecting comprises choosing all database change records of the plurality of database change records that are associated with a given user identifier (e.g., selecting all database change records that relate to a particular business or customer).

Operations 300 continue at step 308, with, for each respective database change record in the sample subset that has already been consumed by a second data consuming component that received one or more database change records from the publication service and updated a primary data store based on the one or more database change records, comparing the respective database change record to first data from the primary data store that corresponds to the respective database change record.

In some embodiments, the primary data store is used by one or more data consumers as an alternate data source to the data source.

Certain embodiments further comprise determining an inconsistency between the primary data store and a particular database change record in the sample data subset. If the second data consuming component has consumed a database change record with a higher offset value than the first data consuming component, some embodiments comprise delaying the parity determination for the particular database change record in the sample data subset until the first data consuming component has consumed the database change record with the higher offset value. If the second data consuming component has consumed no database change record with a higher offset value than the first data consuming component, some embodiments include determining a parity failure.

In some embodiments, the comparing of the given database change record to the first data from the primary data store that corresponds to the given database change record comprises comparing only columns that the given database change record indicates to be changed.

Operations 300 continue at step 310, with making a parity determination based on the comparing, wherein a notification is generated based on the parity determination. The notification may, for example, indicate a database column for which parity failed, or may indicate parity success.

Notably, operations 300 is just one example with a selection of example steps, but additional methods with more, fewer, and/or different steps are possible based on the disclosure herein.

Example System for Efficient Data Parity

Figure 4:
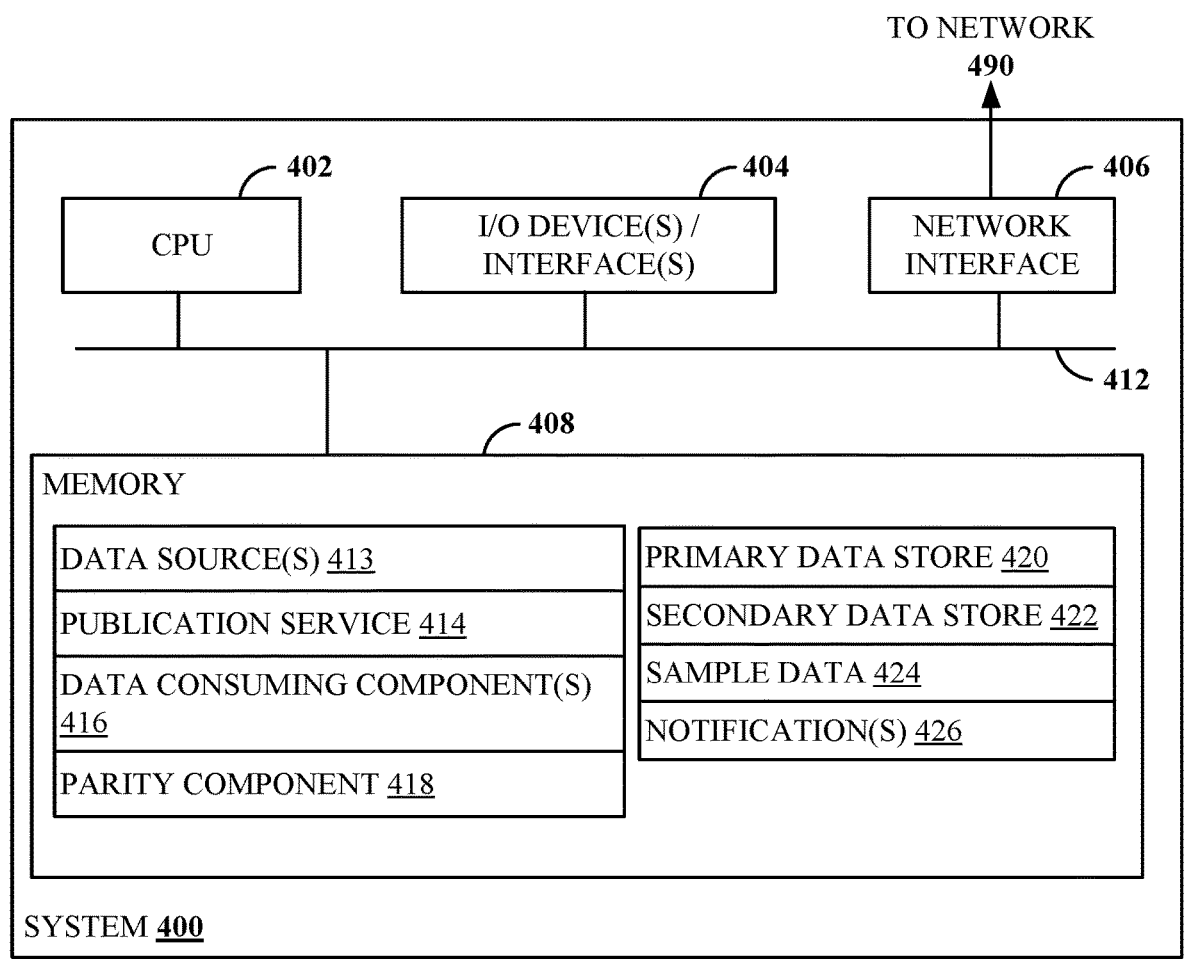
FIG. 4 illustrates an example computing system with which embodiments of the present disclosure may be implemented.

FIG. 4 illustrates an example system 400 that performs techniques for efficiently identifying data inconsistencies between electronic data storage systems as described herein.

As shown, system 400 includes a central processing unit (CPU) 402, one or more I/O device interfaces 404 that may allow for the connection of various I/O devices 414 (e.g., keyboards, displays, mouse devices, pen input, etc.) to the system 400, network interface 406 through which system 400 is connected to network 490 (which may be a local network, an intranet, the internet, or any other group of computing devices communicatively connected to each other), a memory 408, and an interconnect 412.

CPU 402 may retrieve and execute programming instructions stored in the memory 408. Similarly, the CPU 402 may retrieve and store application data residing in the memory 408. The interconnect 412 transmits programming instructions and application data, among the CPU 402, I/O device interface 404, network interface 406, and memory 408.

CPU 402 is included to be representative of a single CPU, multiple CPUs, a single CPU having multiple processing cores, and the like.

Memory 408 is representative of a volatile memory, such as a random access memory, or a nonvolatile memory, such as nonvolatile random access memory, phase change random access memory, or the like. As shown, memory 408 includes data source(s) 413, publication service 414, data consuming component(s) 416, and parity component 418, which are generally representative of data source(s) 110, publication service 120, data consuming component(s) 130 and 140, and parity component 150 of FIG. 1.

Memory 408 further comprises primary data store 420, secondary data store 422, sample data 424, and notification(s) 426, which are generally representative of primary data store 132, secondary data store 142, sample data 144, and notification(s) 160 of FIG. 1.

It is noted that while the components in memory 408 are depicted on a single device, one or more of these components may be located on one or more additional devices, such as connected to system 400 by a network (e.g., network 490).

Additional Considerations

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of efficient data parity, comprising:
receiving, by a first data consuming component in a first data pipeline a plurality of database change records from a publication service, the plurality of database change records indicating changes to an underlying data source;
updating, by the first data consuming component, a secondary data store to include the plurality of database change records;
selecting a sample subset of the plurality of database change records based on one or more conditions; and
for each respective database change record in the sample subset that has already been consumed by a second data consuming component in a second data pipeline that received one or more database change records from the publication service and updated a primary data store based on the one or more database change records:
comparing the respective database change record to first data from the primary data store that corresponds to the respective database change record;
determining an inconsistency between the primary data store and a particular database change record based on the comparing;
responsive to determining the inconsistency, determining whether the second data consuming component has consumed a database change record with a higher offset value than the first data consuming component;
responsive to determining the second data consuming component has consumed a database change record with a higher offset value than the first data consuming component, delaying a parity determination for the particular database change record in the sample subset until the first data consuming component has consumed the database change record with the higher offset value; and
responsive to determining the second data consuming component has consumed no database change record with a higher offset value than the first data consuming component, determining a parity failure,
wherein a notification is generated based on determination of the parity failure.

2. The method of claim 1, wherein the primary data store is used by one or more data consumers as an alternate data source to the underlying data source.

3. The method of claim 1, wherein the comparing of the respective database change record to the first data from the primary data store that corresponds to the respective database change record comprises comparing only columns that the respective database change record indicates to be changed.

4. The method of claim 1, wherein the notification indicates a database column for which parity failed.

5. The method of claim 1, wherein the selecting of the sample subset of the plurality of database change records is based on attributes of the plurality of database change records.

6. The method of claim 5, wherein the attributes of the plurality of database change records comprise user identifiers associated with the plurality of database change records.

7. The method of claim 6, wherein the selecting comprises choosing all database change records of the plurality of database change records that are associated with a given user identifier.

8. A system, comprising:
one or more processors; and
a memory comprising instructions that, when executed by the one or more processors, cause the system to:
receive, by a first data consuming component in a first data pipeline a plurality of database change records from a publication service, the plurality of database change records indicating changes to an underlying data source;
update, by the first data consuming component, a secondary data store to include the plurality of database change records;
select a sample subset of the plurality of database change records based on one or more conditions; and
for each respective database change record in the sample subset that has already been consumed by a second data consuming component in a second data pipeline that received one or more database change records from the publication service and updated a primary data store based on the one or more database change records:
compare the respective database change record to first data from the primary data store that corresponds to the respective database change record;
determine an inconsistency between the primary data store and a particular database change record based on the comparing;
in response to determining the inconsistency, determine whether the second data consuming component has consumed a database change record with a higher offset value than the first data consuming component;
in response to determining the second data consuming component has consumed a database change record with a higher offset value than the first data consuming component, delay a parity determination for the particular database change record in the sample subset until the first data consuming component has consumed the database change record with the higher offset value; and in response to determining the second data consuming component has consumed no database change record with a higher offset value than the first data consuming component, determine a parity failure,
wherein a notification is generated based on determination of the parity failure.

9. The system of claim 8, wherein the primary data store is used by one or more data consumers as an alternate data source to the underlying data source.

10. The system of claim 8, wherein the comparing of the respective database change record to the first data from the primary data store that corresponds to the respective database change record comprises comparing only columns that the respective database change record indicates to be changed.

11. The system of claim 8, wherein the notification indicates a database column for which parity failed.

12. The system of claim 8, wherein the selecting of the sample subset of the plurality of database change records is based on attributes of the plurality of database change records.

13. The system of claim 12, wherein the attributes of the plurality of database change records comprise user identifiers associated with the plurality of database change records.

14. The system of claim 13, wherein the selecting comprises choosing all database change records of the plurality of database change records that are associated with a given user identifier.

15. A non-transitory computer readable medium comprising instructions that, when executed by one or more processors of a computing system, cause the computing system to:
receive, by a first data consuming component in a first data pipeline, a plurality of database change records from a publication service, the plurality of database change records indicating changes to an underlying data source;
update, by the first data consuming component, a secondary data store based on the plurality of database change records;
select a sample subset of the plurality of database change records based on one or more conditions; and
for each respective database change record in the sample subset that has already been consumed by a second data consuming component in a second data pipeline that received one or more database change records from the publication service and updated a primary data store based on the one or more database change records:
compare the respective database change record to first data from the primary data store that corresponds to the respective database change record;
determine an inconsistency between the primary data store and a particular database change record based on the comparing;
in response to determining the inconsistency, determine whether the second data consuming component has consumed a database change record with a higher offset value than the first data consuming component;
in response to determining the second data consuming component has consumed a database change record with a higher offset value than the first data consuming component, delay a parity determination for the particular database change record in the sample subset until the first data consuming component has consumed the database change record with the higher offset value; and in response to determining the second data consuming component has consumed no database change record with a higher offset value than the first data consuming component, determine a parity failure, wherein a notification is generated based on determination of the parity failure.

16. The non-transitory computer readable medium of claim 15, wherein the primary data store is used by one or more data consumers as an alternate data source to the underlying data source.

17. The non-transitory computer readable medium of claim 15, wherein the comparing of the respective database change record to the first data from the primary data store that corresponds to the respective database change record comprises comparing only columns that the respective database change record indicates to be changed.

\* \* \* \* \*